(12) United States Patent
Yamaguchi

(10) Patent No.: US 7,355,732 B2
(45) Date of Patent: Apr. 8, 2008

(54) PRINTING MECHANISM FOR WIRELESS DEVICES

(75) Inventor: Shingo Yamaguchi, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 801 days.

(21) Appl. No.: 09/747,650

(22) Filed: Dec. 22, 2000

(65) Prior Publication Data

US 2003/0038963 A1 Feb. 27, 2003

(51) Int. Cl.
*G06F 15/00* (2006.01)
*G06K 1/00* (2006.01)

(52) U.S. Cl. .................................. 358/1.15; 358/1.11

(58) Field of Classification Search ................. 358/1.9, 358/1.11–1.18, 1.1; 705/26–28, 39–40, 6
See application file for complete search history.

(56) References Cited

U.S. PATENT DOCUMENTS

| | | | |
|---|---|---|---|
| 5,053,786 A | | 10/1991 | Silverman et al. |
| 5,577,268 A | * | 11/1996 | Ho et al. ..................... 455/90.3 |
| 5,614,694 A | * | 3/1997 | Gorenz et al. ............... 174/375 |
| 5,862,321 A | * | 1/1999 | Lamming et al. ........... 709/200 |
| 5,974,401 A | | 10/1999 | Enomoto et al. |
| 5,983,200 A | * | 11/1999 | Slotznick ...................... 705/26 |
| 6,113,208 A | * | 9/2000 | Benjamin et al. ............... 347/7 |
| 6,326,926 B1 | * | 12/2001 | Shoobridge et al. .......... 343/702 |
| 6,452,692 B1 | * | 9/2002 | Yacoub ........................ 358/1.15 |
| 6,606,669 B1 | * | 8/2003 | Nakagiri ...................... 719/327 |
| 6,671,063 B1 | * | 12/2003 | Iida ............................. 358/1.15 |
| 6,732,195 B1 | * | 5/2004 | Baldwin .......................... 710/6 |
| 6,772,331 B1 | * | 8/2004 | Hind et al. ................... 713/151 |
| 6,823,172 B1 | * | 11/2004 | Forrest ........................ 455/41.2 |
| 2002/0067504 A1 | * | 6/2002 | Salgado et al. ............. 358/1.15 |

FOREIGN PATENT DOCUMENTS

| | | |
|---|---|---|
| EP | 0 860 980 A2 | 8/1998 |
| JP | 11296325 | 10/1999 |
| JP | 10263983 | 3/2000 |
| JP | 10322820 | 5/2000 |
| JP | 11359938 | 6/2000 |
| JP | 11094206 | 10/2000 |
| JP | 11150943 | 12/2000 |
| WO | WO 99/15955 A1 | 4/1999 |
| WO | WO 02/01839 A2 | 1/2002 |
| WO | WO 02/48855 A1 | 6/2002 |

OTHER PUBLICATIONS

J. A. Kornfeld, et al., "Isolated Antenna," IBM Technical Disclosure Bulletin, vol. 17, No. 1, Jun. 1974, XP 002029650, p. 13.

* cited by examiner

*Primary Examiner*—Gabriel Garcia
*Assistant Examiner*—Thierry L. Pham
(74) *Attorney, Agent, or Firm*—Hickman Palermo Truong & Becker LLP; Edward A. Becker

(57) ABSTRACT

A method and system for printing electronic document information from a wireless device is described. In one aspect, a wireless communication component is configured to receive electronic document information over a wireless connection. A printer interface component is configured to communicate the electronic document information to a printing device for generating a hard copy document that is based on the electronic document information. A payment component controls the printing of documents by requiring the user to provide monetary payment prior to the hard copy documents being generated.

17 Claims, 5 Drawing Sheets

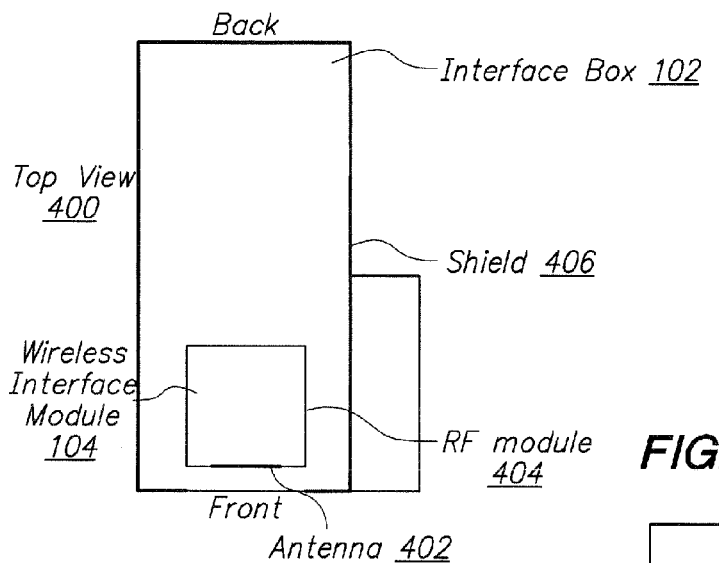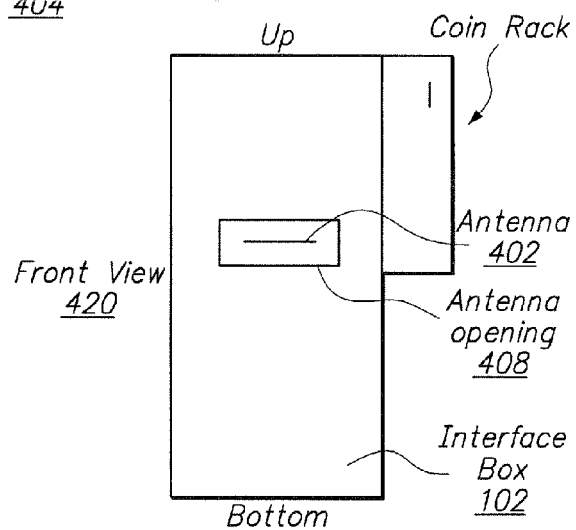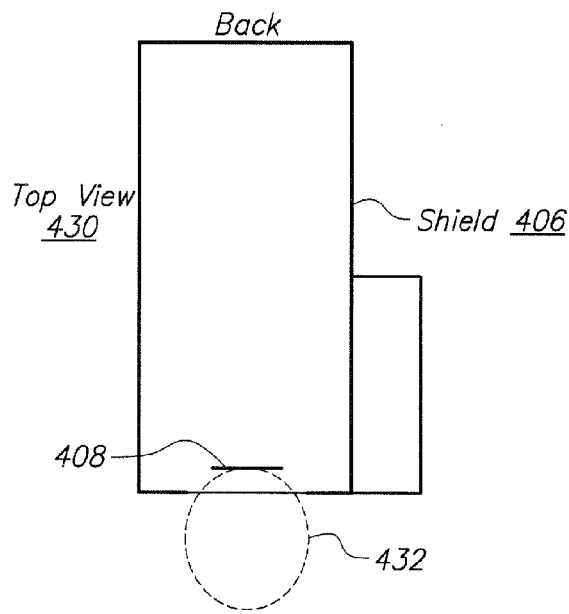

PRINTING MECHANISM FOR WIRELESS DEVICES

FIELD OF THE INVENTION

The present invention generally relates to the printing of electronic documents. The invention relates more specifically to providing a printing mechanism for printing electronic document information from a wireless device.

BACKGROUND OF THE INVENTION

Society has become extremely dependent upon computers and the electronic document information that they provide. As used herein, the term electronic document is broadly defined to include any form or type information that may be electronically read by a computer. For example, the term electronic document includes, but is not limited to, emails, web pages, calendar information, word processing documents, pictures, news articles, television programming information, or any other type of information that may be electronically read by a computer. The electronic document information may exist in a variety of different content formats, that includes but is not limited to HTML, XML, WML, Microsoft Word®, WordPerfect®, JPEG, GIF, or any other format that can be electronically read by a computer.

Recently, a movement has been made to allow users to remotely access this electronic document information through the use of "wireless" devices. For example, wireless devices, such as wireless lap-tops and a variety of different hand-held devices, often referred to as "Highly Constrained" devices (e.g. cellular phones, Palm Pilots, PDAs, etc.) have recently been developed to provide users with the flexibility of remotely connecting to, and accessing a multitude of resources from potentially anywhere in the world. For example, using a cell phone a user may connect to the Internet or other private network to access electronic document information from almost anywhere in the world. As such, these wireless devices make it possible for users to continue to perform their daily activities even when they are located outside their normal business environment.

However, a drawback with using these wireless devices is that a user has no easy method of generating a paper "hard" copy of the electronic content for which they have access. For example, while waiting in the airport, an individual may use a wireless device to connect to a particular rental car web site to make a car reservation for the city of their destination. In making the reservation, the user is typically presented with a web page (electronic document) that defines the specific terms of the reservation and the confirmation number that has been assigned to the reservation. For many individuals, a hard copy of the web page is desired. However, because the wireless devices are generally not configured with a printer, the user has no way of generating a hard copy of the electronic document.

Based on the foregoing, there is a clear need for a mechanism that allows users to obtain hard copies of electronic documents that are remotely accessed through a wireless device.

SUMMARY OF THE INVENTION

A method and system for printing electronic document information from a wireless device is provided. In one aspect, a wireless communication component is configured to receive electronic document information over a wireless connection. A printer interface component is configured to communicate the electronic document information to a printing device for generating a hard copy document that is based on the electronic document information. A payment component controls the printing of documents by requiring the user to provide monetary payment prior to the hard copy documents being generated.

In other aspects, the invention encompasses a computer apparatus, a computer-readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A illustrates a top view of an interface box and the shielding that may surround the box;

FIG. 4B illustrates a front view of an interface box and the antenna opening that is provided for establishing a wireless connection;

FIG. 4C depicts a top view of an interface box that illustrates an electric wave field strength pattern that is produced through the antenna opening.

DETAILED DESCRIPTION OF THE PREFERRED EMBODIMENT

A method and system for printing electronic document information from a wireless device is described. In the following description, for the purposes of explanation, numerous specific details are set forth in order to provide a thorough understanding of the present invention. It will be apparent, however, to one skilled in the art that the invention may be practiced without these specific details. In other instances, well-known structures and devices are shown in block diagram form in order to avoid unnecessarily obscuring the invention.

Operational Context

A printing mechanism is provided for printing electronic document information from a wireless device. In one embodiment, when a user desires to print electronic document information from their wireless device, the user establishes a wireless connection with a wireless interface component that is located a short distance from the user. After establishing the wireless connection, the user transmits the document information from the wireless device to the wireless interface component. The wireless interface component then communicates the electronic document information to a locally connected printing device that generates a hard copy document based on the electronic document information. In certain embodiments, a payment mechanism is provided whereby a user is required to provide monetary value prior to the hard copy document being generated.

Figure 1:
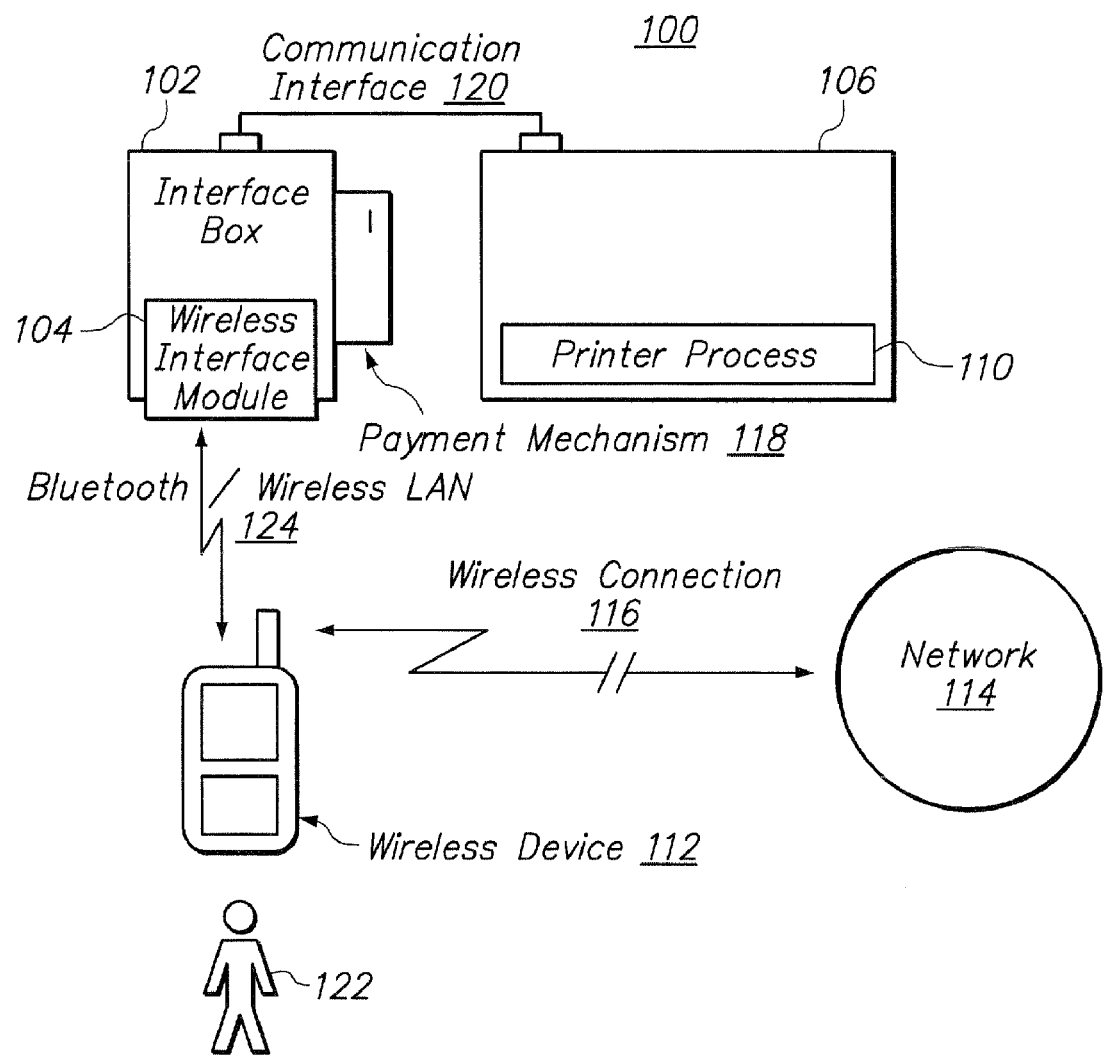
FIG. 1 is a block diagram of a wireless printing system in which the invention may be utilized.

FIG. 1 illustrates a block diagram of a printing system 100 in which certain embodiments of the invention may be utilized. In this example, printing system 100 generally includes an interface box 102, a printing device 106, and a communication interface 120. For explanation purposes, FIG. 1 also includes a wireless device 112 and a network 114.

Network 114 is a network system that may represent a company's private network, a public network, such as the Internet, or a combination thereof. Network 114 may be formed using a variety of different mediums and or protocols. In one embodiment, network 114 provides wireless access to one or more resources that are associated with the network. For example, network 114 may include a wireless access point that allows wireless devices to connect and access the resources of network 114.

Wireless device 112 is a lap-top, cellular phone, Palm Pilot, or other wireless device. In one embodiment, wireless device 112 is capable of establishing a wireless connection 116 with network 114. In certain embodiments, wireless device 112 is configured to execute a browser type application, such as Netscape Navigator®, Microsoft Internet Explorer® or other similar type of WAP or HTML browser application that has been developed for use in highly constrained devices. As depicted, a user 122 can communicate with network 114 over a wireless connection 116 to retrieve and access electronic document information that is associated with network 114. For example, user 122 may use wireless device 112 to establish a wireless connection to a server for accessing content that is available on the Internet.

Wireless device 112 may also include one or more software applications, such as Microsoft Word®, WordPerfect®, Microsoft Excel, etc. that may be used to generate an electronic document. Thus, in certain embodiments, wireless device 112 may itself be used to generate and store electronic document information, any of which may be in a variety of different forms or formats.

The printing device 106 is configured to communicate with interface box 102 over a communication interface 120. In one embodiment, communication interface 120 is a standard interface connection, for example a USB, parallel or serial port connection that allows interface box 102 to communicate with a variety of different printer models from a variety of different printer manufactures. Printing device 106 may be a standard printer device or may instead represent a multifunctional peripheral (MFP) device that includes not only a print process 110, but other multifunctional peripheral components (i.e., a scan process, a raster image processor (RIP), a server process, etc.). For example, printing device 106 may represent an Aficio series multifunctional printer, commercially available from Ricoh Corporation.

Interface box 102 is a combination of one or more hardware and/or software components or processes that cooperate or execute to provide a interface for receiving electronic document information over a wireless connection and for causing a hard copy document to be generated based on the electronic document information that is received. In this example, interface box 102 includes a wireless interface module 104 and a payment mechanism 118. Wireless interface module 104 is configured to communicate with a variety of different wireless devices, such as wireless device 112, through a wireless connection 124. In certain embodiments, to establish wireless connection 124, wireless interface module 104 is configured to use a set of one or more communication frequencies that require the wireless device 112 to be within a relatively short distance from interface box 102. For example, wireless interface module 104 may be configured to use the Bluetooth, 802.11 or other similar protocols that operate over frequencies that are typically used for communicating over a short distance. In one embodiment, wireless interface module 104 is configured to operate in the 2.4 GHz range in communicating with wireless device 112.

Payment mechanism 118 is a combination of one or more hardware and/or software components or processes that cooperate or execute to receive monetary value from individuals desiring to obtain a hard copy of an electronic document. Payment mechanism 118 may be configured to accept a variety of different forms of payment from user 122. For example, payment mechanism 118 may be configured to accept physical currency, such as coins and/or dollars bills, or non-physical currency such as Smartcard, credit card or bank card (ATM) information, Cyber-Cash or any other form of monetary payment. Thus payment mechanism 118 may be configured to accept any number of different forms or types of monetary payment or monetary payment information. In one embodiment, payment mechanism 118 determines a particular number of pages that should be printed based on the monetary value that was provided or authorized by the user. For example, if a user deposits $1.00 into payment mechanism 118, payment mechanism 118 may determine that at most five (5) pages should printed by printing device 106.

Interfacing with Wireless Devices

Figure 2:
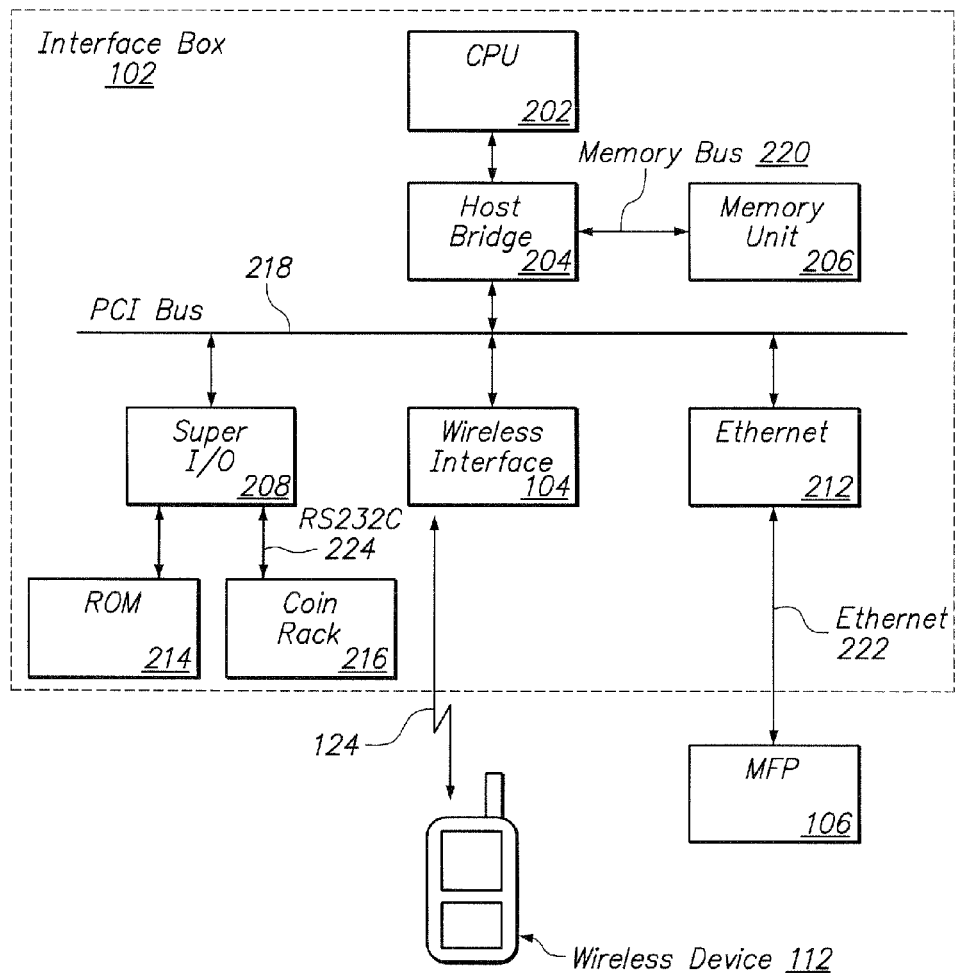
FIG. 2 is a block diagram of the system of FIG. 1 depicting certain internal details.

FIG. 2 is a block diagram of interface box 102 showing certain internal details thereof. In this example, interface box 102 contains a CPU 202, a host bridge 204, a memory unit 206, a Super I/O 208, a wireless interface module 104, an Ethernet card 212, a ROM 214, a coin rack 216, a PCI Bus 218, memory bus 220 and Ethernet communication medium 222.

The CPU 202 is a microprocessor that is configured to act as the system controller. Memory unit 206 provides a memory area for executing instructions and for dynamically storing information that is needed by CPU 202. A memory bus 220 couples memory unit 206 to host bridge 204. Host bridge 204 (often referred to as a "North" bridge) provides an interface for communicating between memory unit 206 and CPU 202. In one embodiment, host bridge 204 provides an interface component that allows simultaneous operation of the CPU 202 and of an external BUS, such as PCI bus 218. In order to realize the simultaneous operation, memory bus 220 and PCI bus 218 are divided. The host bridge 204 arbitrates these two buses.

ROM 214 stores a set of instructions that are used to run interface box 102. In one embodiment, ROM 214 includes instructions that cause interface box 102 to perform functions similar to a Web server.

In this example, payment mechanism 118 is a coin rack 216 that is configured to accept monetary payment and to communicate the payment information to Super I/O 208 over an RS232C interface 224. In one embodiment, Super I/O 208 (often referred to as a "South" bridge) functions as a low speed interface for communicating between the components of interface box 102. In certain embodiments, coin rack 216 itself includes a CPU that is configured to perform a variety of functions that may include, administrative, accounting, authorization, in addition to other functions that may be required by payment mechanism 118.

Wireless interface module 104 provides a communication mechanism for receiving and transmitting information over a wireless connection 124. Ethernet card 212 provides an interface for communicating with printing device 106 over Ethernet communication medium 222.

Processing Electronic Document Print Requests

A variety of techniques may be used to receive electronic document information over a wireless connection and to process requests for generating hard copy documents based on the electronic document information that is received.

Figure 3A:
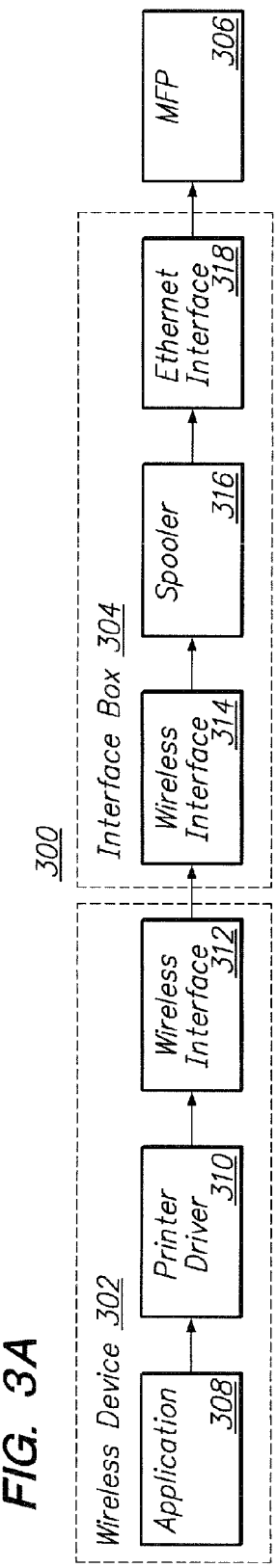
FIG. 3A illustrates a processing sequence in which a wireless device includes software for generating a print ready file.

For example, FIG. 3A illustrates a processing sequence 300 in which a wireless device 302 includes software for generating a print ready file. As used herein, a print ready file is a file that is in a format that can be read and processed by a printing device. For example, a Postscript file that has been generated based on an electronic document is an example of a print ready file.

In this example, a wireless device 302 includes an application program 308, a printer driver 310 and a wireless interface 312. Application program 308 may represent any number of software applications, for example Microsoft Word®, Lotus Notes, Adobe Acrobat, etc. Printer driver 310 represents driver software that is configured to receive print requests from application 308 and to generate a print ready file for delivery to interface box 304. For example, print driver 310 may be configured to generate a file formatted in a page description language ("PDL"), such as a PostScript file or a file formatted in the Printer Control Language ("PCL") defined by Hewlett-Packard Company. Once generated, the print ready file is transmitted from wireless device 302 to interface box 304 via wireless interface 312. In one embodiment, if wireless device 302 does not include the appropriate printer driver for MFP 306, interface box 304 sends a message to wireless device 302 requesting whether the user would like to download the correct printer driver for MFP 306. If the user chooses to download the printer driver, interface box 304 transmits a setup file that automatically installs the appropriate printer driver for MFP 306.

Upon receiving the print ready file at wireless interface 314, the file is forwarded to spooler 316 for transmitting the file to a multifunctional peripheral (MFP) device 306. Thereafter, the file is forwarded to the MFP 306 via Ethernet interface 318, thus causing a hard copy document to be generated based on the print ready file information.

Figure 3B:
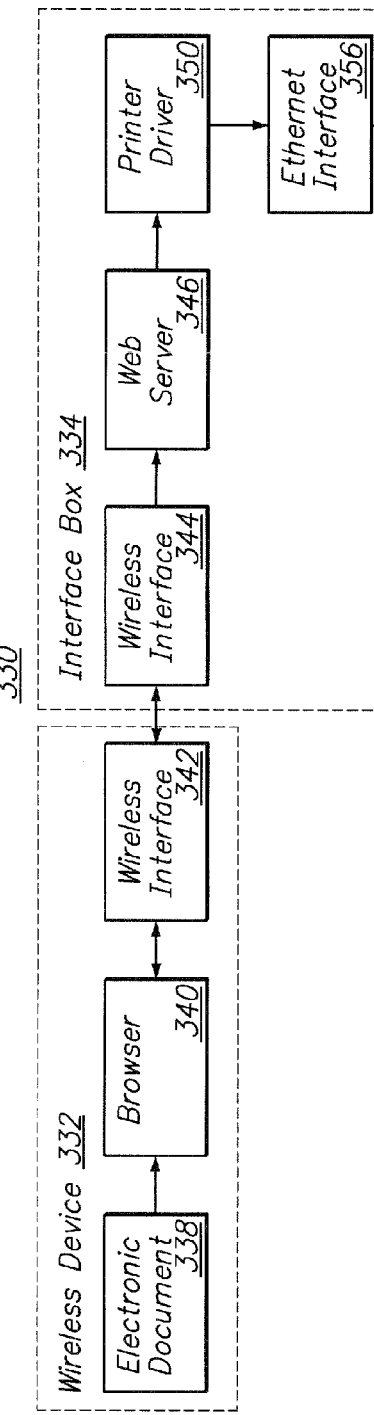
FIG. 3B illustrates a processing sequence in which a wireless device does not include software for generating a print ready file.

Alternatively, FIG. 3B illustrates a processing sequence 330 in which a wireless device 332 does not include software for generating a print ready file. In this example, a wireless device 332 includes an electronic document 338, a browser application 340, and a wireless interface 342. Browser application 340 may represent Netscape Navigator®, Microsoft Internet Explorer® or other similar type of WAP or HTML browser application that has been developed for use in highly constrained devices. Electronic document 338 represents a document for which the user would like to generate a hard copy document.

Further to this example, interface box 334 includes a wireless interface 344, a web server 346, a printer driver 350 and an Ethernet interface 356. When a user wants to generate a hard copy of the electronic document 338, they establish a wireless connection between wireless device 332 and interface box 334. Using browser 340, the user then communicates with web server 346 to request a hard copy of an electronic document, for example electronic document 338. Upon receiving the request, web server 346 sends interface data to wireless device 332 to cause an interface window to be displayed on browser 340. The interface window includes a mechanism whereby the user can enter or select the name of an electronic document that is located on wireless device 332. In response to selecting a particular document, the electronic document is downloaded, for example using the File Transfer Protocol (FTP), to web server 346. For example, web server 346 may include one or more Common Gateway Interface (CGI) scripts that are configured to communicate with the user's browser application and which allow the user to submit information, for example an electronic document file, which is then automatically sent from the wireless device 332 to the web server 346. In one embodiment, the downloaded file is automatically forwarded to print driver 350 to generate a print ready file that is then communicated to MFP 336 to generate a hard copy of electronic document 338.

In another embodiment, in response to receiving a downloaded document, Web server 346 generates a web page based on the electronic document 338 and transmits the web page back to the wireless device 332 for display on browser 340. In one embodiment, in generating the web page, server 346 includes one or more print option selectors that can be used to request the printing of the web page contents. Thereafter, if the user chooses a print option the content of the web page is forwarded to printer driver 350 to generate a print ready file. The file is then forwarded to the MFP 336 via Ethernet interface 356, thus causing a hard copy document to be generated based on the print ready file information.

Shielding the Wireless Communication Signal

In one embodiment, interface box 102 is shielded so as to limit the direction of the RF signal that is being transmitted from the wireless interface module 104. FIG. 4A illustrates top view 400 of interface box 102 according to an embodiment of the invention. As depicted, a shield 406 surrounds interface box 102 which limits the direction in which the RF signal from antenna 402 is radiated for establishing a wireless connection with a wireless device. In this example, the RF module 404 is positioned to the front of interface box 102. A thin antenna opening 408, (as shown in front view 420 of FIG. 4B) controls the direction of the antenna signal thus requiring that the wireless device be substantially in front of the interface box 102 in order to establish a wireless connection. By limiting the signal to an area directly in front of the interface box 102 an inherent security mechanism is provided that reduces the chance that the signal is received by an unauthorized user. For example, certain wireless systems can be vulnerable to "hacking" by unwanted unauthorized network users. However, enforcing a complex security system can subject the user to an involved connection procedure that may actually deter a user from using the wireless printing mechanism. In one embodiment, a need for a complex security system is reduced by minimizing the transmit power and direction of the wireless connection signal (for example using a unity-direction antenna). This can prevent unwanted connections without requiring the user to interface with a complex security system, thus potentially reducing the overall cost of the interface box 102.

FIG. 4C depicts a top view 430 that illustrates an electric wave field strength pattern 432 that is produced through the antenna opening 408. As illustrated, although a normal antenna dipolar pattern will have two sides (one on each side of the antenna), the backside robe is suppressed by the shield 406 that surrounds interface box 102. Thus, a wireless device must be positioned substantially in front of interface box 102 to communicate with wireless interface module 104.

Establishing a Wireless Connection

Figure 5:
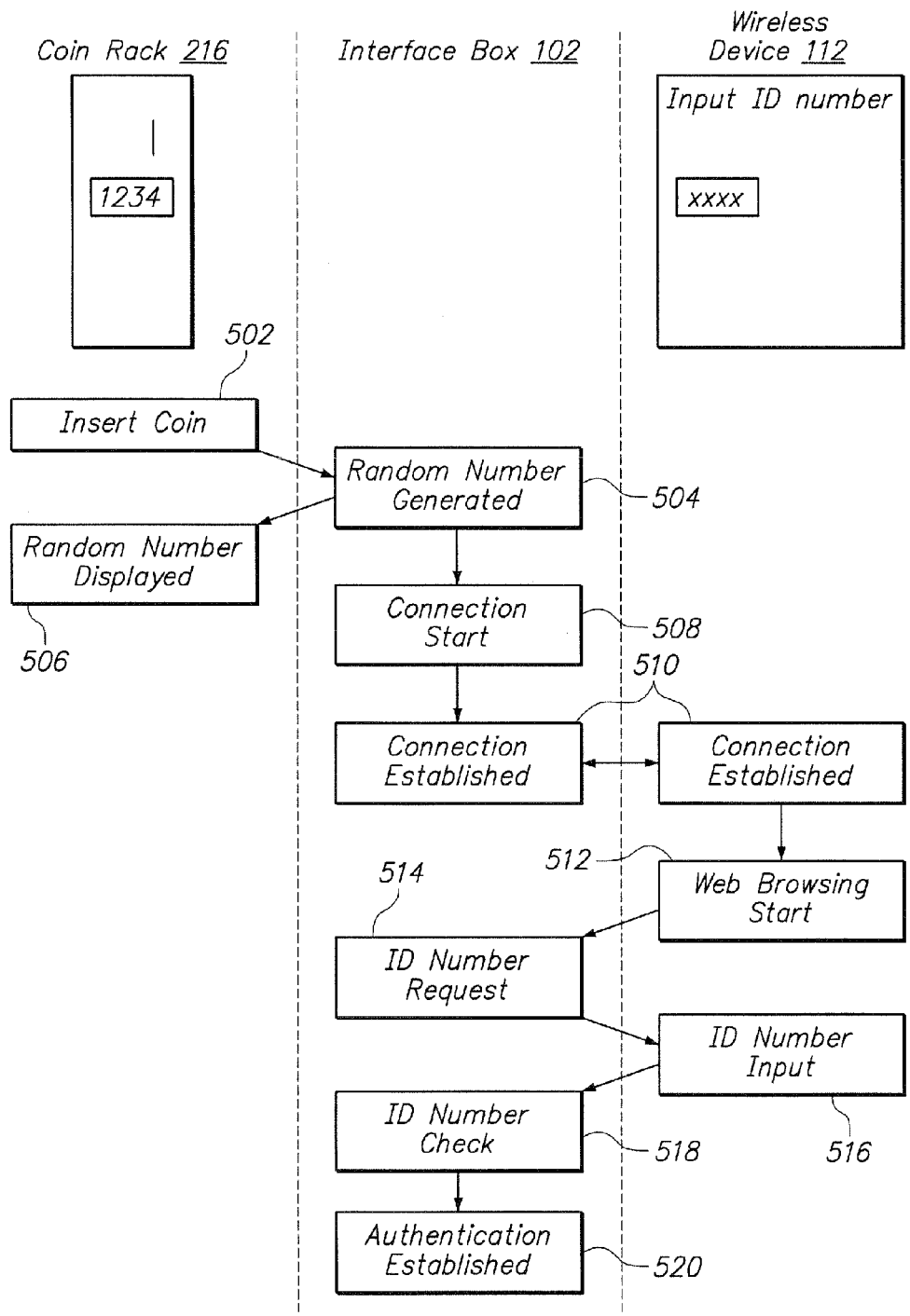
FIG. 5 is a block diagram that illustrates an example of the steps that may be performed by a user to establish a wireless connection between an interface box and a wireless device.

FIG. 5 is a diagram that illustrates an example of the steps that may be performed by a user to establish a wireless connection between the interface box 102 and a wireless device 112. For explanation purposes, the steps of FIG. 5 will be explained with reference to the components illustrated in FIGS. 1 and 2.

At block 502, a user inserts money into the coin rack 216 to initiate the process of obtaining a printed version (hard copy) of an electronic document.

At block 504, interface box 102 generates a random number that is used to authenticate the user for establishing the wireless connection. At block 506, the random number is display is displayed to the user, for example on a an LED circuit that is associated with the coin rack 216.

At block 508, interface box 102 begins to transmit an RF signal for establishing a connection 124 with wireless device 112. At block 510, a connection is established between interface box 102 and wireless device 112. In one embodiment, after establishing the initial connection interface box 102 dynamically establishes an IP address that is used to communicate with wireless device 112. For example, in one embodiment, interface box 102 includes a DHCP server that is configured to dynamically generate an IP address for communicating with interface box 102. In one embodiment, the IP addresses that are generated by the DHCP server are "private" addresses (for example, in the 192.168.x.x range) so as not to interfere with any global address that is publicly known by such entities as the Internet.

At block 512, a browser application is initiated to execute on the wireless device 112. At block 514, interface box 102 causes an interface window to be displayed on wireless device 112 that includes a request for the user to enter a valid ID number.

At block 516, the user enters the random number that was previously generated by interface box 102. At block 518, the interface box compares the value of the number that was entered by the user with the value of the previously generated random number.

At block 520, if the value of the number entered by the user equals the value of the random number that was previously generated, the user is authorized and thus allowed to proceed to generate a printed copy an electronic document that is of interest to them.

Alternatives, Extensions

The wireless printing mechanism that is described herein allows a user to print a hard copy of an electronic document from practically any location in the world. For example, by installing the wireless printing mechanism at locations that are accessible to the public, wireless device users are provided with a mechanism whereby the user can obtain a printed hard copy of any electronic document that can be read by their wireless device.

In describing certain embodiments of the invention, several drawing figures have been used for explanation purposes. However, the invention is not limited to any particular context as shown in drawing figures, and the scope of the invention includes other contexts and applications in which the preview document model described herein is available to other mechanisms, methods, programs, and processes.

In addition, certain types of printer characteristics have been provided as examples in describing the invention. However, embodiments of the invention are not limited to any particular type of printer characteristic. Thus, the specification and drawings are, accordingly, to be regarded in an illustrative rather than a restrictive sense.

Moreover, in this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A printing interface apparatus comprising:
   a wireless interface configured to receive electronic document information from a wireless device over a wireless connection, wherein the electronic document information is associated with one or more electronic documents and comprises non-print ready data;
   a web server configured to dynamically generate web page data that can be processed by a web browser for display on the wireless device, wherein the web page data is generated by the web server based on the received electronic document information;
   a printer driver configured to process the electronic document information and generate print ready data based on at least the non-print ready data in the electronic document information;
   wherein the printing interface apparatus is configured to transmit the print ready data to a printing device over a communications link; and
   a radio frequency directional shield having an antenna opening configured to allow wireless communications between the wireless interface and wireless devices located only substantially in front of the antenna opening.

2. The printing interface apparatus of claim 1, wherein the wireless interface component includes a top side that is surrounded by a shield, the shield limiting reception of the receiving component to those devices that are located substantially in front of the wireless communication component.

3. The printing interface apparatus as recited in claim 1, wherein:
   the web server is further configured to include one or more print option selectors in the web page data that allow a user to request the printing of the contents of the web page data.

4. The printing interface apparatus as recited in claim 1, wherein:
   the print ready data is transmitted to the printing device via the wireless interface.

5. The printing interface apparatus as recited in claim 1, further comprising:
   a wired interface configured to transmit the print ready data to the printing device.

6. The printing interface apparatus as recited in claim 1, wherein:
   the web server is further configured to receive a browser request to generate the web page data; in response to the request, process the electronic document information and generate the web page data, and cause the web page data to be transmitted to a browser from which the request was received.

7. The printing interface apparatus as recited in claim 6, wherein the web page data is transmitted over the wireless interface.

8. The printing interface apparatus as recited in claim 1, wherein the web browser is further configured to generate CGI scripts which, when processed by the web browser, cause electronic document information to be sent to the web server.

9. The printing interface apparatus as recited in claim 1, wherein:
the wireless interface component is configured to communicate with one or more wireless devices using a bluetooth communication protocol.

10. The printing interface apparatus as recited in claim 1, wherein:
the wireless interface component is configured to communicate with one or more wireless devices using a 802.11 communication protocol.

11. The printing interface apparatus as recited in claim 1, wherein:
the wireless interface component is configured to communicate with one or more wireless devices using a signal in about a 2.4 GHz range.

12. The printing interface apparatus as recited in claim 1, further comprising:
a payment component that is configured to control the printing of documents by requiring a monetary payment before completion of the transmitting of the print ready data.

13. The printing interface apparatus as recited in claim 12, wherein:
the payment component is configured as a magnetic card reader that is capable of reading non-physical payment information as payment for generating the hard copy of the one or more electronic documents.

14. The printing interface apparatus as recited in claim 12, wherein:
the payment component is configured to accept physical currency as payment for generating the hard copy of the one or more electronic documents.

15. The printing interface apparatus as recited in claim 12, wherein:
the payment component is configured to accept Cyber-Cash information over the wireless connection as payment for generating the hard copy of the one or more electronic documents.

16. The printing interface apparatus as recited in claim 1, wherein the wireless interface component includes means for downloading one or more printer drivers over the wireless connection, wherein the one or more printer drivers are compatible with the printing device.

17. A printing interface apparatus comprising:
means for receiving electronic document information from a wireless device over a wireless connection, wherein the electronic document information is associated with one or more electronic documents and comprises non-print ready data;
means for dynamically generating web page data that can be processed by a web browser for display on the wireless device, wherein the web page data is generated based on the received electronic document information;
means for processing the electronic document information and generate print ready data based on at least the non-print ready data in the electronic document information;
means for transmitting the print ready data to a printing device over a communications link; and
means for allowing wireless communications between a wireless interface in the printing interface apparatus and wireless devices located only substantially in front of the wireless interface.

* * * * *